US008788508B2

(12) United States Patent
Kuzmin

(10) Patent No.: US 8,788,508 B2
(45) Date of Patent: Jul. 22, 2014

(54) OBJECT ACCESS SYSTEM BASED UPON HIERARCHICAL EXTRACTION TREE AND RELATED METHODS

(75) Inventor: Yevgeniy Kuzmin, Celebration, FL (US)

(73) Assignee: Microth, Inc., Staten Island, NY (US)

( * ) Notice: Subject to any disclaimer, the term of this patent is extended or adjusted under 35 U.S.C. 154(b) by 150 days.

(21) Appl. No.: 13/431,257

(22) Filed: Mar. 27, 2012

(65) Prior Publication Data

US 2012/0254197 A1 Oct. 4, 2012

Related U.S. Application Data

(60) Provisional application No. 61/468,337, filed on Mar. 28, 2011.

(51) Int. Cl.
*G06F 17/30* (2006.01)

(52) U.S. Cl.
USPC .......................................... 707/751

(58) Field of Classification Search
USPC ................................ 707/748–751
See application file for complete search history.

(56) References Cited

U.S. PATENT DOCUMENTS

| | | | | |
|---|---|---|---|---|
| 6,011,554 | A * | 1/2000 | King et al. | 715/811 |
| 2007/0016862 | A1* | 1/2007 | Kuzmin | 715/700 |
| 2007/0064627 | A1* | 3/2007 | Campos | 370/255 |
| 2008/0295005 | A1* | 11/2008 | Salesin et al. | 715/763 |
| 2012/0039161 | A1* | 2/2012 | Allan et al. | 370/216 |
| 2012/0059859 | A1* | 3/2012 | Jiao et al. | 707/797 |

* cited by examiner

*Primary Examiner* — Joshua Bullock
(74) *Attorney, Agent, or Firm* — Allen, Dyer, Doppelt, Milbrath & Gilchrist, P.A.

(57) ABSTRACT

An object access system may include an input component, and a processor coupled to the input component and configured to construct an extraction tree based upon an ordered list of objects, each object having an object description and associated weighted value. The extraction tree may include nodes, each node having a node range for representing a group of objects based upon the respective object descriptions. The nodes may include a parent node, and ordered child nodes associated therewith and having overlapping node ranges. The processor may be configured to traverse the extraction tree, based upon user input from the input component, along an access path from a root node to a terminal node including a selected access object.

34 Claims, 7 Drawing Sheets

OBJECT ACCESS SYSTEM BASED UPON HIERARCHICAL EXTRACTION TREE AND RELATED METHODS

RELATED APPLICATION

This application is based upon prior filed provisional application Ser. No. 61/468,337 filed Mar. 28, 2011, the entire subject matter of which is incorporated herein by reference in its entirety.

FIELD OF THE INVENTION

The present invention relates generally to systems and methods for object access using electronic devices and, more particularly, embodiments of the present invention relate to efficient systems, methods, data structures and user interfaces for access to objects in large ordered object lists via electronic devices using broad range of languages and limited input implements.

BACKGROUND OF THE INVENTION

Access to data objects in large data collections using limited input interfaces may be a problem for a wide range of consumer and industrial applications and devices. These objects may comprise media files, goods, books, personal information, etc. An important feature of such objects may be that they have a simple or composite textual description, which is used for the access, and input of this description is equivalent to the access to an object. Typical user interfaces may provide limited number of possible inputs, such as buttons, touch screen areas, or gestures. For example, one application of such an access system is generic text input for mobile devices, where objects descriptions are words of some language dictionary or corpus.

Any human language may have hundreds of thousands or millions words and word forms to describe the world around us. It was a challenging problem to represent all these words in a writing form to store them as information. Semantic writing systems of ancient human languages, such as Egyptian, Maya, or Chinese, were object-based and used symbols of different types: pictograms resembling objects they represent, logograms for parts or forms of words, and ideograms for abstract ideas. The scripts of modern semantic languages, such as Chinese and Japanese, simplified and changed over the time, but still may include up to tens of thousands basic symbols, without any upper limit for a number of more sophisticated symbols.

The huge step for mankind was the development of the phonetic writing system, which had a tremendous impact for human communication and progress. Phonetic writing systems are based on symbols representing basic phonemes: sounds and groups of sounds of the spoken language, but not objects and notions. Therefore, each word can be represented by a sequence of basic symbols corresponding to an access path in some hierarchical dictionary tree with branches corresponding to basic symbols. The number of basic symbols in phonetic scripts may range from 20-40 for languages using alphabets (Latin, Cyrillic, Hebrew, Korean, etc.) to 40-100 for syllabic languages (Japanese Katakana and Hiragana, most of Indic, Pacific and South-Eastern languages).

With the development of computers and electronic devices, data input has become one of the fundamental problems of computer-human interaction. Typical data input systems are usually based on language writing systems with elementary input actions corresponding to symbols of language script system. Any language object may be represented by a sequence of these elementary input actions. The most common implementation of such script-based input system is the keyboard with input keys representing symbols of scripts. Due its simplicity, the keyboard input approach is a desirable input method for a broad range of the alphabet languages and electronic devices having enough real estate for a keyboard (key sizes being constrained by sizes of human fingers).

A keyboard may become a cumbersome and inconvenient solution for languages using scripts with a number of symbols greater than the number of keys of regular keyboards. The typical approaches for text input for such languages are based on converting native symbols into some simple artificial sequential form. It may be a phonetic representation based on a script of a foreign language, such as Pinyin, Jyutping, or artificial scripts, such as Zhuyin (Bopomofo). This approach may be inconvenient due to differences in pronunciation and transcription of the same word in different regions (e.g. Mandarin, Cantonese) and may require study of a new scripting system.

Another approach is graphical decomposition of a structure of a symbol representing number, order and interpositions of basic strokes or glyphs, such as Cangjie, and 4 corners. Such artificial representations may lead to a large numbers of necessary input actions or/and number of synonyms represented by these simplified input actions. The next step is sequential input of artificial representation. If sequential representation has several synonyms, then an additional step of selection of the desired word in a list of native words may be required.

Miniaturization of electronic devices in general, development of mobile devices especially, and adding of communication functions to typical devices with limited input interfaces may cause issues with text input. Limited surface area or compact design of a device may not provide enough space for a convenient keyboard, but miniature keyboards may be difficult to use and may increase the sizes of devices, which may be undesirable. The typical device may include hardware providing a limited number of input actions, such as a keypad, a directional pad, a plurality of buttons, a plurality of switches, and touch and gesture pads.

The number of basic input actions may be much less then the number of symbols even in alphabet-based languages, such as in reduced keyboard applications. An approach for input systems with limited interfaces may comprise combining symbols of script into a few symbol groups corresponding to input actions. Furthermore, a user may either select a symbol within a group by additional actions (e.g. Multi-tap), or the input system may generate a list of all words represented by these input actions (e.g. T9) and additional word selection step may be required. To optimize selection procedures for mobile text input, some approaches may utilize different prediction methods based on additional statistical information about frequency of use of letters and letter combinations (e.g. LetterWise), or words (e.g. T9, WordWise). They place most likely candidates into the beginning of candidate lists to speed-up selection. The input for non-alphabet languages at devices with limited input interfaces may be an even more difficult process. It may combine both conversion of native symbols into some sequential form and grouping of elements of sequential representation. In some approaches, the native symbols may be represented as sequences of very few elemental strokes. For example, the 5 strokes method for Chinese language phone input uses only five basic strokes: horizontal, vertical, diagonal, dash, and hook. A similar issue may arise for touch input interfaces. The size of human fingers may constrain sizes of touch input elements, and many interfaces designed for mouse point input may become cumbersome.

Phonetic keyboard input methods may be inefficient when number of input objects is small or limited by other properties, application, or content. These object lists could be: days of week, months, names of authors or singers, titles of books or songs, names of towns or states, commands of an application, etc. In these cases, object lists include much less objects then the whole language word corpus and use of generic phonetic input methods are excessive. Simple selection methods (e.g. scrolling lists, menus, pie charts, hierarchical menus) and prediction may be used for data input for object lists, but very often, their structure is difficult to use and is non-optimal.

Another area of application of access system is online databases storing information about a large number of objects having a composite textual description, such as online stores, directories, libraries, and catalogs. Usually, individual fields in a composite description are provided in a list description, so input of the description is a combination of methods used for list input with all their limitations.

The efficient object access has some elements in common with computer search applications. Computer search algorithms may be well studied in Computer Science, and there are proven optimal data structures and algorithms, such as optimal search and alphabetic trees. These optimal computer algorithms and structures may not be well suited for human use. The issue may be that a computer needs the whole precise description to be already entered before the search. Another principal aspect is that humans can easily solve many cognitive problems, which require very sophisticated computer algorithms. This happens due to a native parallelization of human thinking and vision, and the ability to compare, value and categorize objects without clearly described or sophisticated properties. For example, a human can easily compare two written Chinese words or know that a phone is a mobile electronics device, but it's a very difficult task for the computer. A human can also simultaneously compare and select from several objects. Yet another problem is that data structures used in computer search algorithms are subdivision trees, which are not optimal for data access.

SUMMARY OF THE INVENTION

In view of the foregoing background, it is therefore an object of the present invention to provide an object access system with efficient and robust input capability.

The object access system may comprise an input component, and a processor coupled to the input component and configured to construct an extraction tree based upon an ordered list of a plurality of objects, each object having an object description and associated weighted value. The extraction tree may include a plurality of nodes, each node having a node range for representing a group of objects based upon the respective object descriptions. The plurality of nodes may comprise at least one parent node, and a plurality of ordered child nodes associated therewith and having overlapping node ranges. The processor may be configured to traverse the extraction tree, based upon user input from the input component, along an access path from a root node to a terminal node including a selected access object.

The processor may be configured to construct the extraction tree to minimize an average weighted length of the access path for traversal of the extraction tree. The object access system may further comprise an output component coupled to the processor and configured to present to a user respective object descriptions of the plurality of ordered child nodes of the at least one parent node during the traversal of the extraction tree. Each object description may comprise a textual sequence in a language corpus, and the associated weighted value may comprise a frequency usage of the corresponding textual sequence in the language corpus.

For example, a textual sequence may comprise at least one of a symbol, a word or a phrase of a language. The language corpus may be associated with a language comprising a non-alphabet language. Each object description may comprise at least one of a composite hierarchical or a multidimensional structure. Each object may comprise at least one of (i) an item in online store, (ii) a song, (iii) a book, (iv) a movie, (v) a news article, (vi) a personal name, (vii) a geographic name, (viii) an application, (ix) a command, and (x) a menu item.

The object access system may be configured as a part of a device selected from a group consisting of a phone, a smartphone, a personal media device, a GPS device, a computer, a tablet, an electronic dictionary, a watch, a TV set, an automobile control panel, a smartcard, a stenographic device, and an assistive communication device. The processor may be configured to: update the ordered list and the weighted values based upon at least one of a user preference and an access history, and reconstruct the extraction tree based upon the updated ordered list.

Each node range may comprise at least one of a word stem, a partial description of a level of hierarchy, and a range in the ordered list. The input component may be configured to receive a number of distinguishing user input actions, and the at least one parent node may have an associated number of child nodes less than or equal to the number of distinguishing user input actions. A number of terminal child nodes for each parent node of the extraction tree may be greater than or equal to a set number value.

The respective node ranges for non-terminal child nodes of the at least one parent node of the extraction tree may not be not overlapping. The input component may comprise a touch screen display having a plurality of touch input areas, and the user input may comprise selection of a touch input area from a plurality thereof representing the plurality of child nodes for the at least one parent node.

Additionally, each touch input area may have a display size proportional to a total weighted value for the group of objects represented by a corresponding child node. The user input may comprise a plurality of directional displacements in directions representing selections of child nodes. The access path may be represented by a continuous sequence of directional displacements representing selections of corresponding child nodes. The user input may comprise a touch of plurality of buttons representing selections of child nodes.

For example, the user input may comprises a plurality of at least one gesture, colors or sounds representing selections of child nodes; and wherein the access path may be represented by a sequence of gestures, colors or sounds. The user input may be ambiguous, and the processor may be configured to reconstruct the extraction tree at each access step for objects in selected child nodes. The object access system may be further configured to receive from an external source a code representing the access path to an object and to traverse the tree accordingly the received access code to the access object.

Another aspect is directed to a method of operating an object access system comprising an input component, and a processor coupled to the input component. The method may comprise using the processor to construct an extraction tree based upon an ordered list of a plurality of objects, each object having an object description and associated weighted value. The extraction tree may comprise a plurality of nodes, each node having a node range for representing a group of objects based upon the respective object descriptions. The plurality of nodes may comprise at least one parent node, and a plurality of ordered child nodes associated therewith and having overlapping node ranges. The method may include using the processor and the input component to traverse the extraction tree, based upon user input from the input component, along an access path from a root node to a terminal node including a selected access object.

Another aspect is directed to an apparatus with a computer-readable medium. The computer-readable medium may have computer-executable instructions for causing the object access system to perform steps comprising constructing an extraction tree based upon an ordered list of a plurality of objects, each object having an object description and associated weighted value. The extraction tree may comprise a plurality of nodes, each node having a node range for representing a group of objects based upon the respective object descriptions. The plurality of nodes may comprise at least one parent node, and a plurality of ordered child nodes associated therewith and having overlapping node ranges. The steps may include traversing the extraction tree, based upon user input from the input component, along an access path from a root node to a terminal node including a selected access object.

DETAILED DESCRIPTION OF THE PREFERRED EMBODIMENTS

Figure 1:
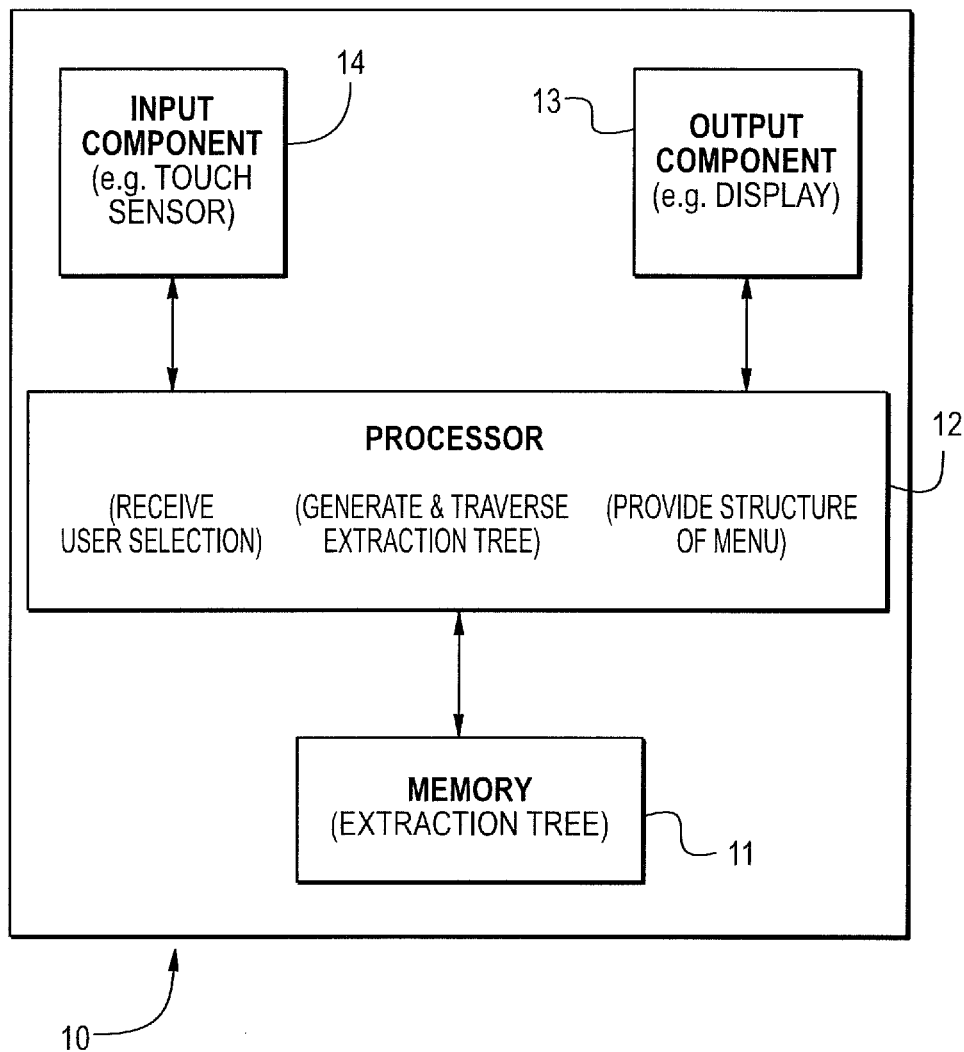
FIG. 1 is a schematic diagram of an object access system, according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Accordingly, improved methods, data structures and user interfaces are desired to provide efficient object access systems for a broad range of electronic devices, applications and languages. In light of the foregoing, embodiments of the present invention provide improved systems, data structures and methods for performing efficient access to objects with textual descriptions using limited input interfaces.

An aspect is directed to an object access system, using input interfaces using limited number of input actions.

An aspect is directed to an object access system based on recursive selection of an object group containing the desired object in limited sets of ordered alternative object groups. The number of groups may be less or equal to number of input actions.

An aspect is directed to an object access system minimizing average weighted cost of input in a set of object having assigned access weights.

An aspect is directed to an object access system based on extraction trees and their constrained variants, for example, a suggestion tree, and representing the whole set of access objects.

An aspect is directed to a language independent object access system without explicit input of language script elements describing the desired object.

An aspect is directed to an object access system for providing efficient text input for Chinese and other semantic, syllabic and syllabary non-alphabet based languages.

An aspect is directed to an object access system for providing efficient object access for limited sets of objects having simple or composite hierarchical and multi-dimensional descriptions.

An aspect is directed to an object access system for providing efficient language-independent object access and text input for devices with limited input interfaces, including, but not limited to mobile and connected devices, industrial and military devices, media appliances, and other devices.

An aspect is directed to an object access system for providing efficient object access for different data systems and applications, including, but not limited to archives, catalogs, libraries, on-line stores, directories.

An aspect is directed to an object access system for providing the method for design of efficient touch and gesture user interfaces for applications for mobile and connected devices.

An aspect is directed to an object access system, using the rational design of screen touch interfaces, based on structure and weights of branches of corresponding extraction trees.

An aspect is directed to an object access system, using gesture interfaces, based on continuous directional or positional gestures.

An aspect is directed to an object access system, using interfaces, based on color and sound sequences.

An aspect is directed to an object access system for providing efficient user interfaces for menu structures, selection of commands and operations, applications and modes switching.

An aspect is directed to an object access system for providing efficient user interfaces for users with limited communication abilities.

Figure 2:
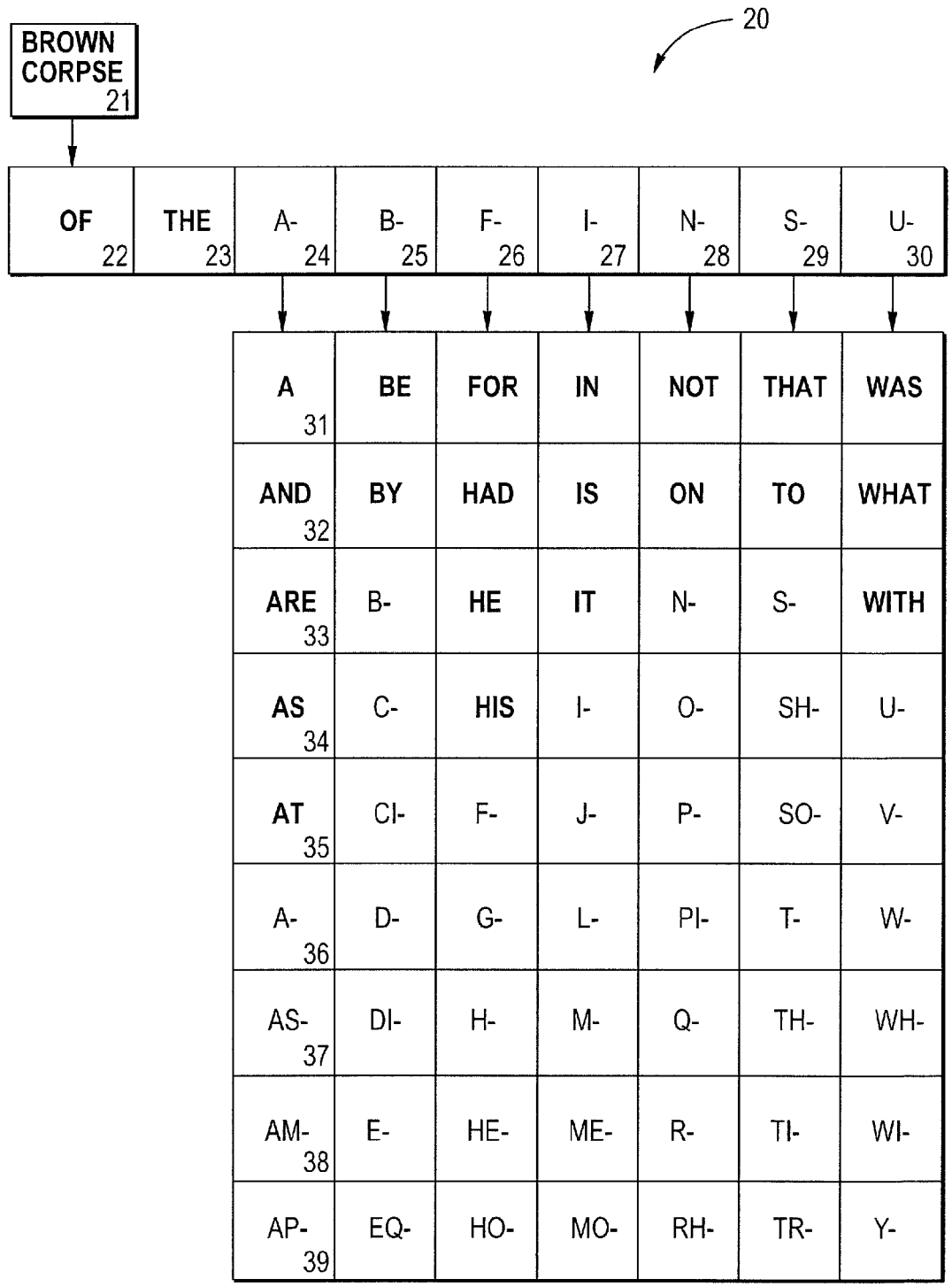
FIG. 2 is a schematic diagram of a portion of a multi-level extraction tree, according to the present invention.

Referring now to FIGS. 1-2, an object access system 10 according to the present invention is now described. The object access system 10 illustratively includes an output component comprising a display 13, and an input component comprising a touch sensor panel 14, a memory 11, and a processor 12 coupled to the display, the touch sensor panel, and the memory. In other embodiments, the display 13 may comprise other output devices, such as an audio speaker. The processor 12 may be configured to process an ordered corpus of a plurality of object with assigned values and weights, and generate a multi-level extraction tree 20 based upon the processed corpus and store the extraction tree in the memory 11.

In the illustrated embodiment (FIG. 2), the processed corpus relates to an English language dictionary. The extraction tree 20 includes a root node 21, and a plurality of ordered child nodes 22-30 for each non-terminal node. Each non-terminal node 21, 24-30 represents a continuous subgroup of the ordered object corpus, and each terminal node (22, 23) represents a unique object from the corpus. The processor 12 may be configured to provide information to create a selection menu 40 (FIG. 3) on the display 13 and for receiving input from a user via touch panel 14 based upon respective potential object values for ordered child nodes 22-30 in at least one level of a given node 21 of the extraction tree. Advantageously, the object access system 10 may provide object access for the user with reduced access costs, minimizing average weighted length of the access.

More specifically, the processor 12 may be configured to provide the information to output component 13 to create the selection menu comprising descriptions of subgroups of potential object values corresponding to each of the child nodes 22-30 of the given node 21 of the extraction tree 20, and receive a user input via input component 14 determining selection of the oldest child node containing the desired object. The processor 12 may be configured to traverse recursively to the next level in the extraction tree based upon the user selection of the oldest child node containing the desired object, and generate a new selection menu for receiving subsequent input from the user based on respective potential object values of child nodes of the selected node. This process completed when user selects a terminal node including the desired object.

In the illustrated example, the initial current node is the root node 21 and the selection menu 40 (FIG. 3) would include entries for the words "Of", "The", and seven non-terminal groups of "A-", "B-", etc. The description of each group represents all words from the stem assigned to this group to the stem assigned to the next group. Let's suppose that a user desires to input the word "and". At each step of the recursive access process, a user needs to select the first entry of menu containing the desired word. In our example, the user needs to select the entry "A-", corresponding the child node 24. The system traverses to the next level of the extraction tree 20 and the node 24 becomes the new current node with child nodes 31-39. A new selection menu based on object values of child nodes 31-39 is generated, and user selects the entry corresponding the node 32 containing just one word "and". The node 32 is terminal, so the user performed the access to the desired word.

Additionally, each node 21-39 in the multi-level extraction tree 20 may comprise one of a terminal node (22, 23 & 31-35) and a non-terminal node (21, 24-30, 36-39), the terminal node representing a complete object value, such as a complete English language word. The non-terminal node may represent a partial object value. The partial object value may comprise at least one of a word stem, and a range of object values, for example.

The input component 14 may recognize some number of distinguishing input actions at each step of the access process. The number of input actions may not be less then the number of child nodes. In some embodiments, the input actions may be screen touches or continuous gestures. In the illustrative example, the object access system 10 provides the menu 40 with 9 fields, and a user touches the corresponding area of the menu at the display. In some embodiments, each field of the selection menu may have a corresponding display size, and the output component 13 may be configured to selectively set the corresponding display size for each field in the selection menu based upon the total weight of objects comprising the corresponding child node.

The potential object values for child nodes (22-30) may comprise overlapping object values. For example, in the illustrated example, at the level including child nodes 22-30, the node 22 representing the complete potential input value of "of", overlaps with node 28, which represents a group for object values in the range from "n-" to "s-".

Another aspect is directed to a method of operating an object access system 10 comprising an output component 13, an input component 14, and a processor 12 coupled to the said components. The method may include using the processor 12 to process an ordered corpus of a plurality of object with assigned values and weights, and using the processor 12 to generate and store a hierarchical extraction tree 20 based upon the processed corpus. The extraction tree 20 comprises the root node 21, and a plurality of child nodes 22-30 for each non-terminal node, each non-terminal node representing a continuous subgroup of the ordered object corpus, and each terminal node representing a unique object from the corpus. The method may include using the processor 12 to provide information to create a selection menu on the output component 13 and for receiving input from a user via input component 14 based upon respective potential object values for child nodes of a given node of the extraction tree 20.

Extraction Trees

The disclosed access method is based on a data structure, introduced in the invention and hereinafter called an extraction tree. The extraction tree is quite different to subdivision trees used for existing search methods. Every node in an extraction tree represents a group of objects determined by a common description of all objects belonging to the group. The description could be of different types, for example, names of all objects in the group started from "con-", "all objects in the group are mobile devices", "all object in the group are names of Asian countries", "all object in the group are fiction books", etc. The description should clearly determine the membership of an object to group.

One embodiment of the group description is a range of some object values. In this case, values of all objects belonging to a group are located between some minimum and maximum range values of the group in the ordered list of all items. For example, "all words from 'cat' to 'dog'", "all years from 1900 to 1950", etc. Range values may be different for any object values in a group, for example, "all words having the first letter from "q" to "x", "all words starting from "th". The only requirement is that it should easily compare an object value with range values and to determine does a given object belong to a group.

Properties and processing of the extraction tree is different then that of subdivision trees. All child nodes of the extraction tree having a common patent node are ordered from older to younger sibling. Sibling groups may overlap each other and some objects may be members of different groups, but the group of younger child cannot belong entirely to the group of an older child. These are exemplary differences between extraction and subdivision trees. In a subdivision tree, sibling nodes are unordered and it is possible to check whether an object belongs to a group in arbitrary order since groups are not overlapping and the object belongs to only one group. In the extraction tree, the method must check an object belonging to a group in the order of groups, because the object may belong to several groups, and a user selects the first group containing an object. A special group containing all objects not belonging to all older child groups may exist, and this group is always should be the youngest child group.

In cases where there is parallel processing of all groups, the belonging vector for subdivision trees contains only one positive answer, and the method selects the group corresponding to this positive answer. For extraction trees, this vector may contain several positive answers, and the method selects the group corresponding to the first by order positive answer.

The object access method of the invention is based on the following assumptions: all objects have some value description and numeric attribute representing their weight. A representation of a description may be of any type, for example, numerical, textual, graphical, visual, semantic, audible, gestures, sounds or any other type or combination or composition of these types. In all embodiments, any two objects can be compared and ordered by their descriptions. Therefore, the whole set of objects may be represented by an ordered dictionary of objects, and the method can use ranges for description of groups.

Another aspect of the disclosed access system is that all objects have access weights, which may represent different properties of objects. For example, weight may represent usage frequency of objects. Another example of weight attribute may be a number of accesses to an object in some period of time. Yet another example of weight may be a profit generated by sales of an object for some period in an online store. The weight of object is selected to minimize a target function.

Word Input

One of the embodiments of disclosed access system is based upon word input. The process of word input may be considered as an access to a desired word in some word corpus. This process satisfies all our assumptions. Words of any language can be ordered basing on different properties: alphabetical order, phonetic order, stroke order, structure of glyph, etc. The weight of a word may be a frequency of its usage in some word corpus or application. Therefore, the present invention provides a method for efficient script independent text input.

The access process of the invention is a recursive process of selection of a group containing a desired object from an ordered set of several sibling groups of objects, wherein an input action determines a selection and after each step the selected group has child groups of smaller sizes, until the group containing only the desired object is reached. So the access process can be considered as a traversal of extraction tree constructed over the whole object set. Each node of this tree corresponds to a group of objects, and each branch of the tree corresponds to one of elementary input actions. Each selection reduces the size of the current group of objects and provides more precise description of the desired object. The cost of object access is a number of steps necessary to access the object or a length of a path in the extraction tree from the root to the object. The cost represents efforts or time necessary to access an object. The structure of an extraction tree of disclosed input system minimizes the total weighted cost of access, i.e. the sum of products of weights and costs for all objects. Similar characteristic is the average access cost—the total weighted cost subdivided by a number of all objects.

To understand better the process of construction of extraction trees, consider at first the case of binary extraction tree. It corresponds to interfaces with two input actions. The binary extraction tree of the invention is very different from regular subdivision alphabetic binary trees and binary search trees, because it stores ranges of values instead of single subdivision value in nodes. Therefore, the node of the extraction tree doesn't subdivide the set of objects into two ordered groups, but extracts the first group from the list of objects and creates the second group from the remaining objects. This improvement provides the reduced average access cost for extraction trees comparing to known binary search trees. The average access cost is more close to the average cost of Huffman trees, which can be built only for sets of non-ordered objects. For example, for the set of objects {A,B,C} with weights {0.1, 0.8, 0.1}, the binary extraction tree may have the structure (B,(A,C)) and the average access cost is equal to 1.2 as for the Huffman tree, but the structure of optimal subdivision search tree is either (A,(B,C)) or ((A,B),C) and the average search cost is equal to 1.9.

In the general case, at each step of the access process, the system presents some limited number of groups of objects corresponding to ranges in the list of object. These groups are ordered and each next group extracts objects it contains from the current list of objects. A group may contain a single object or several objects corresponding to some range, and possibly the last group may contain all remaining objects. A range of a group cannot be inside a range of any previous group, but may intersect with a range of a previous group. This is a principal difference of access extraction trees of the invention comparing to known n-ary subdivision trees, in which subdivision intervals cannot intersect each other. The method may test an object belonging to all groups in parallel, and to select the first group it belongs, for the next step of access process.

In another embodiment, the number of child groups may be different at any step of the access process. This number of child groups may be greater at upper levels of the tree, and decrease to lower levels. This approach may be beneficial because the user could easily memorize static upper levels, even they may have more child groups, because they are used most frequently. The number of child groups may be also different at bottom levels, because some ranges contain different number of terminal objects.

Constrained Extraction Trees

In some embodiments, it is beneficial to have additional constrains to the structure of the extraction tree or node descriptions. In one embodiment, the constrained extraction tree may comprise a suggestion tree. Each parent node of suggestion tree may have child nodes of two types: terminal and non-terminal. All terminal child nodes are older than all non-terminal ones and ranges of non-terminal nodes are not overlapping. Therefore, the suggestion tree may be considered as a combination of extraction and subdivision trees. Most weighted terminal objects are extracted, but all other objects are subdivided onto non-overlapping groups. This simplifies human processing of such trees. At each selection stage, a user at first checks a few terminal objects, and if there are no desired object, may check remaining groups in parallel. For the suggestion tree, the method may store only one range value per group, because another one is determined by the range value of the following group. This reduces storage space needed for suggestion tree by about two times.

Construction of the extraction and suggestion tree may be an iterative process: at every stage, the method adds a new object to the current tree constructed for all previous objects and rebuilds it minimizing total weighted cost of access. In order to simplify this process, objects are added to tree in order of their weights from heaviest to lightest. At first, the method traverses the tree to find the pass from root of the tree for a new word. After that, the method checks whether the total weight of the tree would be reduced if some terminal objects in the path of the inserted word would be shifted one level below. The method executes these checks along the path of the new word back from the inserted object to the root of our tree. The method checks all terminal objects along the path in the order of increasing respective weights. After each shift, the method rebuilds the sub-tree for former sibling groups of shifted terminal node. This greedy, but near optimal and fast algorithm for construction of suggestion tree is well suited for dynamic reconstruction of suggestion trees and addition of new words to a dictionary.

Another possible greedy top-down approach for construction of suggestion trees is level balancing. It is based on a simple assumption that the weight of the lightest object at some level of a tree should be greater then sum of weights of N (where N is the number of sons in the trees) heaviest terminal objects or groups at the next after the next (+2) level of the sub-tree. This approach relates the algorithm to construction of Huffman tree. Other algorithms and methods may be used for the construction and optimization of the extraction and suggestion trees, as will be appreciated by those skilled in the art, including but not limited by based on classical dynamic programming, simulated annealing, Hu-Tucker reconstructive leveling, arithmetic subdivision and other approaches.

Another possible embodiment of suggestion tree may use word stems representing groups of words having the same initial parts: letters, sounds, strokes, classification, images or any other representations. For example, for dictionary input, such frequent stem may be: "th-", "con-", etc, or for composite descriptions the stem may be a part of the hierarchical description: "phones.mobile.". Terminal words may be considered as a stem ended by the space. In this case, the suggestion tree will have three types of groups in the following order: terminal object groups, stem groups, and subdivision groups. Addition of stem groups may further reduce average access cost.

The structure of extraction tree is determined by number of input actions provided by the access system for selection. In some cases, it is beneficial to assign different types of nodes to different input actions. For example, touches might be associated with non-terminal nodes and directional flicks with terminal nodes. In another embodiment, each displacement of a continuous directional gesture may be associated with a selection of non-terminal nodes and the release of finger with terminal object. Such structure constrains also may lead to constrained extraction trees. Other possible constrains for extraction trees may be a fixed number of terminal child nodes for each node or a limited length of the description for non-terminal nodes.

Since the disclosed method may use a static dictionary and weights of words, then after some period of adaptation many frequent words and stems may be inputted blindly, because user will memorize the sequences of selections providing input of most frequent words.

Examples of Suggestion Trees

Figure 3:
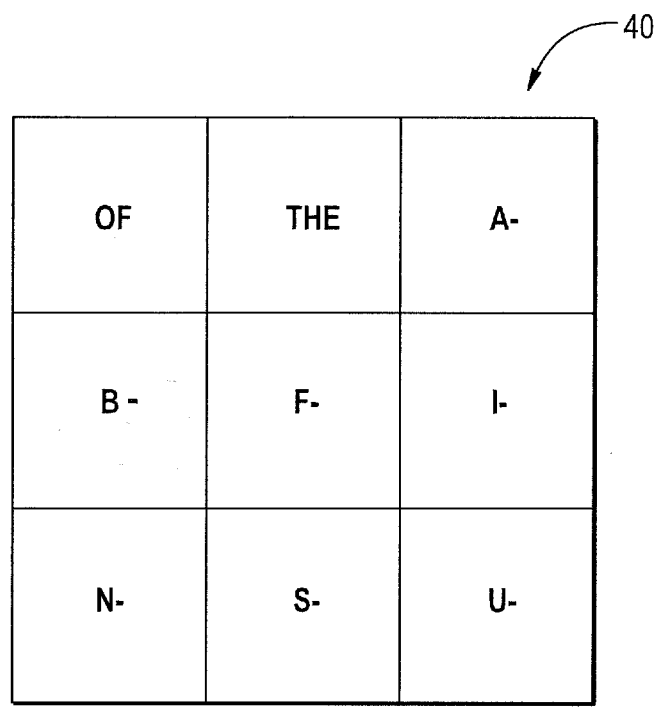
FIG. 3 is a schematic diagram of a top level of a 9-ary access tree for English input based on word frequencies, according to the present invention.
Figure 4:
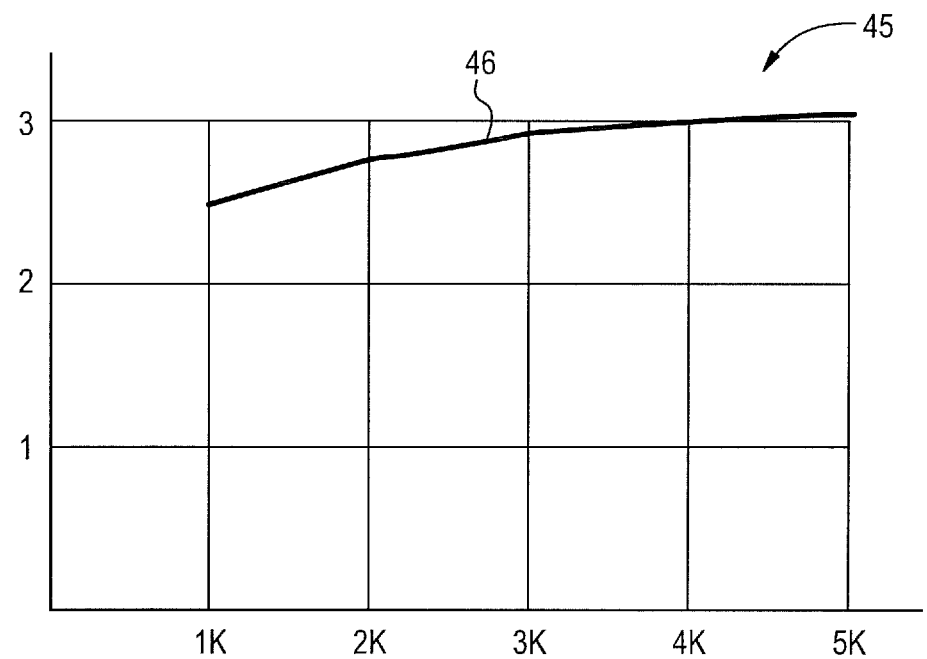
FIG. 4 is a chart illustrating dependency of average input cost on the size of the dictionary, according to the present invention.

FIG. 3 demonstrates a structure menu 40 of top level of 9-ary suggestion tree of one possible embodiment built using the first method for Brown Corpus (5000 most frequent words) of written American English. Two most frequent words "the" and "of" are entered by a single click. The rest of the corpus may be subdivided into 7 groups (a-, b-, f-, n-, s-, u-). The average access cost for this tree and corpus of this size is less then 3.1. This is in about two times less then average cost of input of English word using a full keyboard: 6.1=5.1 (average English word length) +1 (space). This cost is much less then the cost of any typical mobile input method using 9-keys keypad. The access cost 46 increases slowly as a logarithmic function with increasing of the size of dictionary as demonstrated in a diagram 45 of FIG. 4, so expected access costs for large dictionaries of hundred thousands words is about 4.0.

In this example, word stems are used, the word stems having no more then one undetermined letters, as group range values. This approach provides a simpler and more compact interface then to use whole words as range values. Another important benefit of this approach is that the use will not need to store whole words as group range values, but only a few letters. This radically reduces the amount of necessary storage space for suggestion trees.

Figure 5:
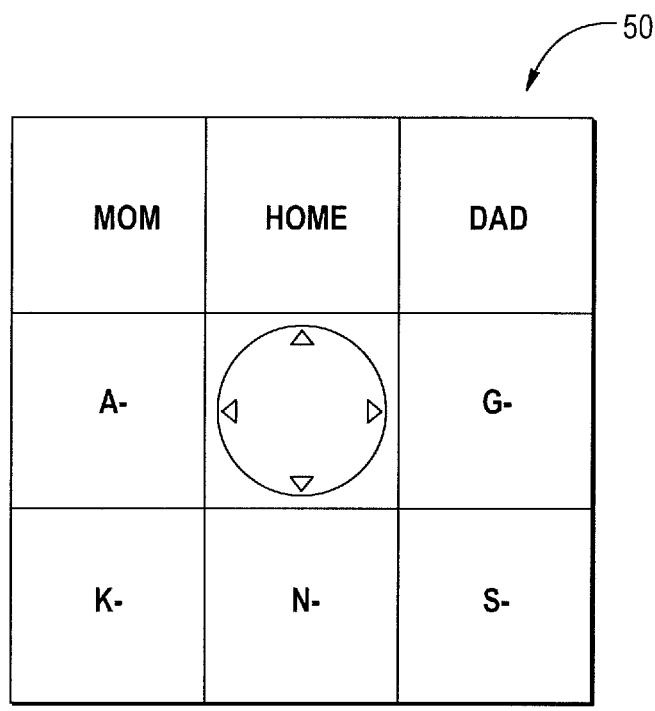
FIG. 5 is a schematic diagram of a user interface and top level for contact application for 8-directional d-pad input, according to the present invention.

Another example is illustrated in FIG. 5, which depicts an access display menu 50 for a contact list using 8-ary extraction tree structure with an 8-directional pad. The most frequent contacts like "Home", "Mom", and "Dad", are terminal groups at the top level. Remaining contacts may be subdivided into weighted groups like: "A . . . ", "G . . . ", "K . . . ", "N . . . ", and "S . . . ". Each group contains all items from the range value of the group to the range value of the next group. To separate visually different types of groups, terminal groups may have a different display format, for example, different shape, font or background. Terminal objects also may be represented by images.

Figure 6:
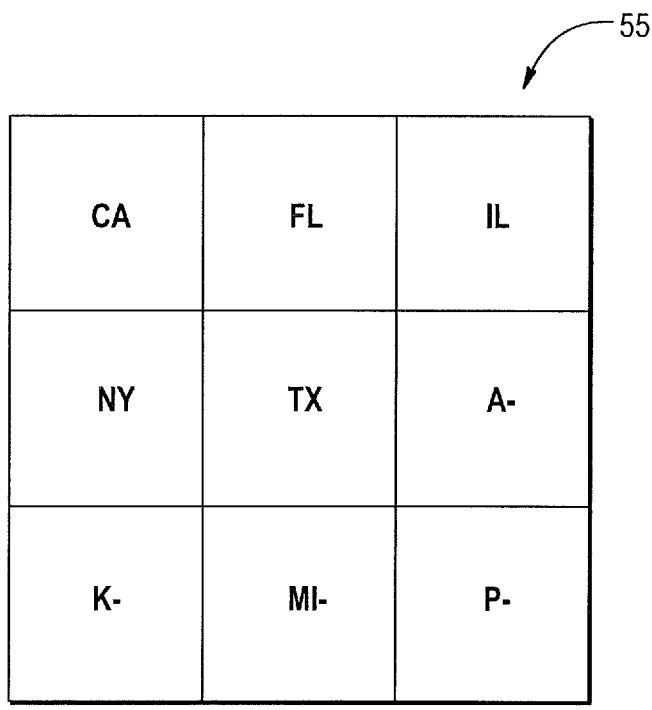
FIG. 6 is a schematic diagram of a user interface and top level for input of U.S. states, according to the present invention.

FIG. 6 demonstrates the top level 55 selection menu of 9-ary suggestion tree for selection of U.S. state with weights being based upon 2010 state populations. Five states CA, FL, IL, NY, and TX are terminal nodes at the first level, other states are subdivided into four groups A-, K-, Misso-, P-. Most of states are at the second level, with 14 small states at the third level of the tree. Average cost of input using this tree is 1.67 inputs. This is just about 0.5% more then for the optimal Huffman tree, and 16% less then for input of 2 symbol state code using keyboard.

Non-Dictionary Input

The described above (FIG. 3) dictionary access tree provides access to objects only belonging to the given dictionary of objects. It is impossible to input non-dictionary objects for semantic languages or object lists, because such objects may have unique representation not inherited from its description, but the disclosed access method allows input even for non-dictionary words for phonetic languages. This also provides a simple process for addition of user and application specific words and objects into the dictionary.

Figure 7:
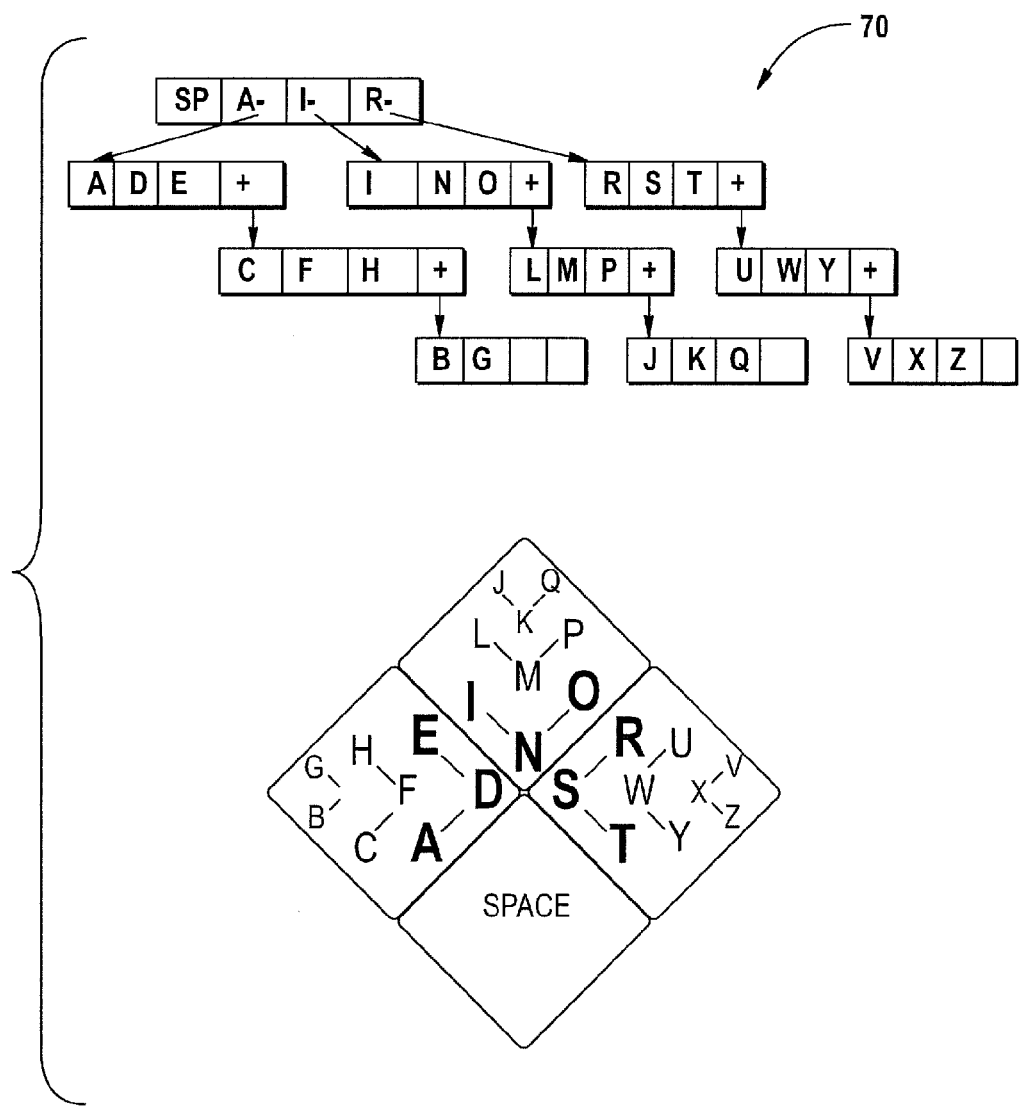
FIG. 7 is a schematic diagram of the structure of the ternary suggestion tree and 4-button user interface for input of English letters, according to the present invention.

Input of non-dictionary words is based on statistical information on frequencies of symbols and n-gram symbol combinations of phonetic languages. The simplest implementation of non-dictionary input might be based on symbol frequencies. FIG. 7 illustrates the structure of the ternary suggestion tree 70 and corresponding 4-button interface for input of English letters. To enter a symbol a user touches a button containing the desired symbol (the number of touches is equal to the level of the symbol), and then touches one of three other buttons. For example, to enter "K" a user touches the top button 3 times, and then touches the bottom button. Average cost of input for this method is 2.15, comparing to 2.12 for the Huffman tree and 2.00 for multi-tap input using the regular phone keypad. Another possible improvement may be using of frequencies of bigrams—combinations of two sequential symbols. The method may store a 2-dimensional table of frequencies of all possible bigrams. Even bigrams, which do not exist in a regular language, should have some minimal, non-zero frequency value.

Supposing the method reaches a node in the suggestion tree containing only terminal nodes, but our non-dictionary word doesn't belong to them. In this case, the method may create artificial nodes, based on frequencies of possible continuations of stems in already selected phonetic range. The method may consider a virtual set of all artificial words adding one symbol to all possible word stems in the range of the group. For example, for the range from "mea . . . " to "meir . . . ", the set of artificial stems includes two groups of words: from "mea_" to "mei_", and from "mei_" to "meir_". The symbol "_" means the space and indicates the end of a world. As weights of artificial stems in the first group, the method uses frequencies of bigrams from "ea" to "eh". To calculate weights of artificial words in the second group, the method may multiply the frequency of the bigram "ei" to frequencies of bigrams from "i_" to "iq". Now, the method has weights of all new possible artificial stems and can use them for the grouping algorithm described above. Therefore, the selection process remains the same even for input of non-dictionary words.

To make the non-dictionary input more efficient, the method may use frequency statistics on trigrams, tetragrams, and longer n-grams. The method may combine word stems and symbol combinations statistics. For example, depending on average length of word in a language use statistics on word's stems up to 2-4 symbols long and for longer words use symbol combinations data. The method may even apply this approach from the top of the extraction tree not using dictionary statistics at all. This may further reduce memory requirements for storage of more complex extraction and suggestion tree for dictionary words at mobile devices.

Non-Alphabet Input

Input of a word is equivalent to an access to this word in a dictionary. The text input method of the disclosure based on object access is different from any existing text input methods based on sequential input of phonetic or graphical elements representing words of language scripts. Such script independent approach may be especially beneficial for a broad range of non-alphabet languages used by more then half of the world population.

The disclosed input method provides an interface using a native language scripts and doesn't require conversion of native symbols into other artificial and foreign phonetic or structure systems, and reverse conversion to the native form. This helps to avoid problems with learning and understanding of the artificial input systems, differences in pronunciation, scripting or usage, and synonyms differentiation.

Described above, the input method for alphabetic languages is applicable for syllabic and syllabary languages (e.g. Japanese Katakana and Hiragana, most of Indic, Pacific and South-Eastern languages) without any changes. As group range values, the method may use word stems with only one undetermined character, because usually every character in these languages is usually a combination of consonant and vowel sounds. So expected weighted cost of input for these languages should be close to cost of input for alphabetic languages.

One embodiment of the invention may be applied to text input for semantic languages, such as Chinese and Japanese. Typically, there are no known native input methods for these languages; all of them use artificial conversion into some other sequential input system with a lesser number of basic input elements. The proposed method may be adapted to any of existing orderings for such languages. Since it may be based on graphical representations of words, it doesn't have any issues with regional pronunciation differences. The proposed method radically reduces the number of input actions for semantic languages, and makes input for them as simple as input for alphabetic languages. It is especially important for mobile input. The number of input actions may be reduced in several times, comparing to existing mobile input methods for semantic languages.

For example, the input system for Chinese language may be based on the frequency dictionary of words in traditional Pinyin transcription. Each word having a separate meaning should have its own assigned weight, even if the Pinyin spelling is the same. After that, the method could use Pinyin ordering and native script for user interfaces.

Another embodiment of disclosed method is iconographic input systems. In many cases, objects or notions may be represented by pictures or icons, having the same meaning at different languages. For example, commands and operations of some home appliances or industrial equipment, or software applications, goods in some store, etc. Since proposed method is script and language independent, it may be applied for such type of input. It may be important for equipment used in different countries, or for language independent system interfaces, or for kids. For example, the abovementioned contact application may have pictures of persons in contact list as description, which may be joined in some groups like family, friends, co-workers, clients, etc. Weights may be determined by frequency of contacts. Such iconographic languages and input may be specially designed for optimal interaction with specialized systems with limited set of operations.

Semantic Grouping

Phonetic grouping of the suggestion tree may be combined with semantic grouping. Some groups at top levels of the suggestion tree may represent objects using different semantic categories. For example, for language input, they may comprise different parts of speech: verbs, nouns, adverbs, etc. For an application, they may comprise different group of commands: File, Edit, View, Tools; for music or book lists, they may comprise different genres. For a store list, they may comprise different categories of goods. The principal requirement to the structure of semantic grouping is the same as for phonetic one: to minimize average access cost to object. This requirement allows us to build efficient extraction tree structures using a combination of semantic and phonetic grouping. Such mixed suggestion trees combining phonetic and semantic groups are very beneficial in many cases. This structure is preferred for persons having difficulties with reading, like kids, person with disabilities, students of foreign language. Words in semantic groups may have an image representing them for easy understanding.

Touch Input Interfaces/Rational Interface

The disclosed access system is input interface independent, meaning that it may be easily customized for any existing input hardware or method. The access system of the invention only assumes that the input interface provides some predefined number of distinguishing input actions, which is equal to or greater then a number of group alternatives and a screen has enough space to display these alternatives.

The preferred embodiment of input interface of access system is touch screen presenting a set of input areas of the same size, wherein each input area corresponds to and presents an alternative and touch of an area selects the corresponding alternative. These input areas may represent a rectangular array of input areas, a row or a column of areas, or any other pattern, for example, circular. This set of input areas may be considered as a virtual "keyboard" for object access. Sizes of input areas are almost the same, because weights of groups of suggestion tree at the same level are close.

Another embodiment of input interface may use input areas, which have sizes proportional to ratios of weights of objects belonging to groups corresponding to these areas. Such "rational" design of input interface is beneficial in cases when some groups have significant deviations of weight from some average value and object sets with dynamically changed weights. Larger groups will have bigger sizes for easier selection and the interface will be adjusted correspondingly to weight changes. This embodiment is also very suitable for design of interfaces of web sites and applications with limited number of input actions and dynamically changed weight of objects, like news sites and on-line stores. In this case, sizes of input areas may be also changing correspondingly with weight changes.

Figure 8:
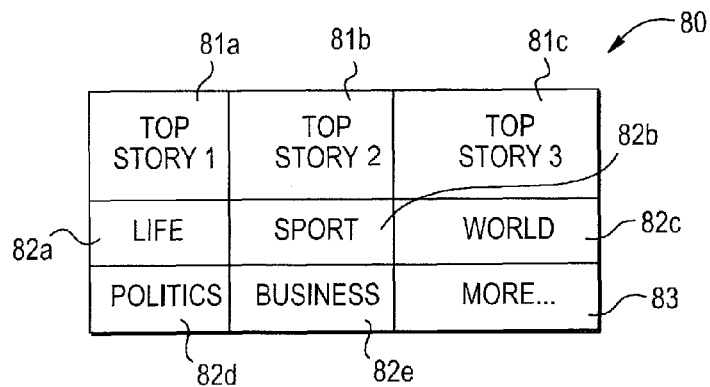
FIG. 8 is a schematic diagram of the rational design of touch input interface, according to the present invention.

To implement the rational design, the initial grid structure is selected. It represents the subdivision of screen in a number of areas equal the number of sons in suggestion tree. This structure is represented by screen subdivision tree. Any possible variants of hierarchical screen subdivision tree into input areas may be used for rational interfaces of the invention. For example, it could be a binary subdivision of a screen by horizontal and vertical lines with groups assigned to screen areas. This structure also may depend on types of groups. For example, the rational interface 80 illustrated at FIG. 8 represents three terminal objects 81*a*-81*c*, five semantic groups 82*a*-82*e*, and a group containing all other objects 83.

Gesture Interfaces

Another embodiment of input interfaces of the invention may use simple directional screen strokes. For example, four directional screen flicks: "UP", "DOWN", "LEFT", "RIGHT" may determine an input interface for a ternary suggestion tree. In another embodiment, other four diagonal flicks may be added to implement 8-nary suggestion tree. These simple directional strokes are determined by a direction of the vector connecting initial and final points of a gesture. The main benefit of directional strokes is that they don't require accurate positioning at the screen and might be entered blindly.

Another embodiment of the input interfaces of the invention may use continuous directional gestures composed from a sequence of simple directional strokes. Any such continuous gesture determines a sequential path in a corresponding suggestion tree leading to the desired object or word. In this case, the number of sons in this constrained suggestion tree from one side is less by one then the number of stroke directions, because two consecutive simple directional strokes in the continuous gesture should have different directions, but from another side each node of the suggestion tree have an additional terminal son associated with input event corresponding to the end of a gesture (finger release from the screen). Therefore, continuous 8-directional gesture determines a pass in an 8-any constrained suggestion tree.

Figure 9:
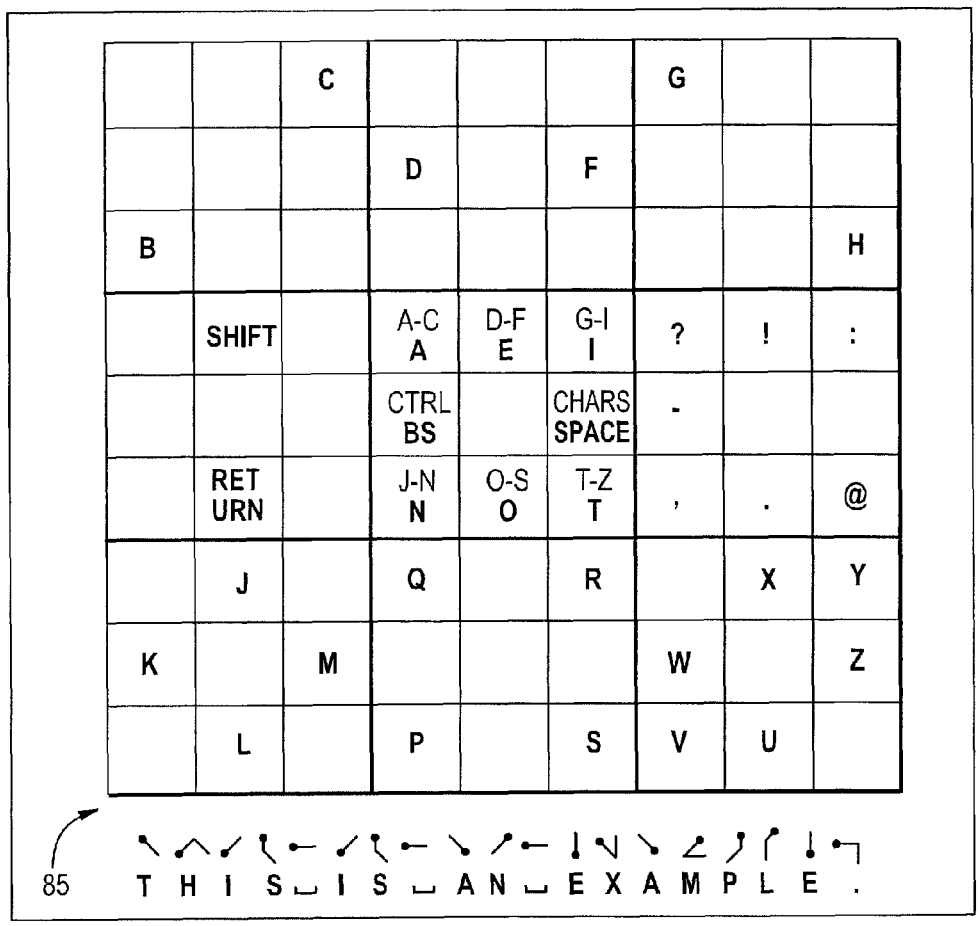
FIG. 9 is a schematic diagram of the continuous 8-directional gesture input interface for input of English letters, according to the present invention.

Continuous directional gestures and corresponding constrained suggestion trees might be efficiently used for different types of input. FIG. 9 illustrates an embodiment of continuous gesture input interface 85 based on English letter frequencies. Most of frequent letters and actions are represented by simple directional flicks. Other letters may be represented by gestures having two or more simple directional flicks. The most frequent letters determines value ranges of objects belonging to each child/direction. Such type of continuous gesture letter input might be beneficial for eye-free gesture input of non-dictionary words.

Figure 10:
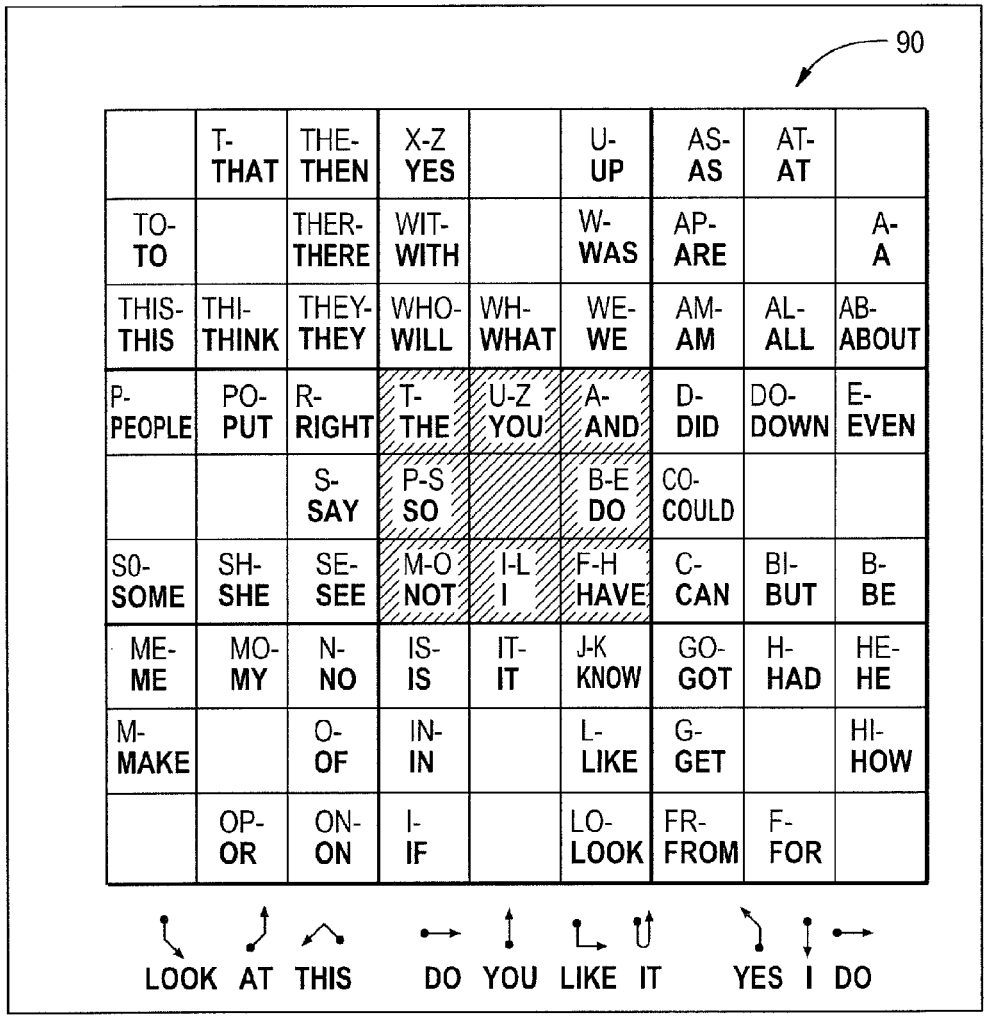
FIG. 10 is a schematic diagram of the top levels of continuous 8-directional gesture input interface for input of English words, according to the present invention.

Another embodiment of the gesture interface 90 of the invention uses continuous gestures for input of English words. FIG. 10 demonstrates initial parts of the 8-directional continuous gestures and corresponding ranges and terminal words based on frequencies in British National Corpus for spoken English. In this embodiment, terminal word nodes are associated to ends of gestures and range values are associated to continuations of gestures. For simplicity of input, terminal suggestion words belong to the corresponding continuation ranges, which subdivide the whole set of possible words into non-intersecting intervals. To input a word, a user draws a continuous gesture composed from simple directional strokes corresponding to selection of ranges containing the desired word, and releases the finger when this word is the same as the suggestion word for the range. For example, at the beginning the system displays range values as in the center box at FIG. 10. To enter the word "like", a user, at first, draw the stroke down, because "like" belongs to the range "I-L", and the system displays the suggestion word "I" (shown in bold font) and updates range values as shown in the middle-bottom box at FIG. 10, corresponding to the stroke down. "I" is not the desired word, and user continues to draw the stroke to the right selecting the range "from L- to LO-". The system displays the next suggestion word "LIKE". This is the desired word, so user releases the finger from the screen entering this word.

Such continuous stroke signs representing words might be a very efficient way of shorthand input and writing for any language, especially for non-alphabet languages, like Chinese, already based on graphical representations of words. After some learning period user might input these shorthand gestures fast and blindly. Continuous gestures may be also very beneficial for persons with communication disabilities. For example, person with speech/hearing disabilities may use 8-directional hand gestures for intercommunication. Such directional gesture sign language is easier and faster then many existing systems of sign communications. An apparatus utilizing position and motion sensors may be used for recognition of the sequence of displacement of directional hand gestures in the space and conversion of these sequences into speech. 8-directional stroke signs also may be used for blind persons as body language, using tactile signs, or as a language-independent substitution of letter-based Braille alphabet. Stroke signs also may be used in situations, when other means of communications are limited, for example, as visual and tactile gestures for military communication.

Continuous directional gestures are also very efficient for switching and selection of operational modes or functions of applications or devices. In this case a usage statistics of different operations may be used for weights of operations in the suggestion tree. Additionally, both methods for input of words and symbols using continuous directional gestures may be combined to provide the possibility of input of non-dictionary words.

Combined Interfaces

Touch and gesture interfaces of the invention may be combined using simple positional gestures, which connect pairs of predefined input areas at the touch screen. The combined interface has several predefined input areas and each input corresponds to a stroke connecting a pair of these areas.

Continuous positional gestures are composed from a sequence of simple positional gestures. For example, in one of the embodiments the input interface of the invention might have 8 predefined input areas evenly positioned at a circle. Each area represents a selection range. After user selection of an area with range containing the desired word, the system displays the suggestion word for this area and all areas are updated with new range values of sons of selected node. If suggested terminal word is the desired word, user releases the finger, otherwise user makes a gesture connecting the current area and a new area with range containing the desired word. This interface provides the functionality similar to the described above interface for continuous 8-directional gestures for word input (FIG. 10), so area ranges may be the same as direction ranges, and suggestion object for ranges may be the same as in the example above.

Another way to combine touch and gestures is to use positional stokes. To make an input user touches one of the pre-defined area and makes a directional stroke in one of the 5 directions. This interface may be useful for selection of inflected forms, corresponded to strokes, of a linguistic lemma object, corresponding to the touch. In another embodiment, single touches may correspond to selection of ranges and directional strokes to selection of terminal suggestion objects within the selected range. For example, if we have only one stroke for selection of suggestion object, then area ranges and suggestion objects may be the same as in the example above.

Input Hardware

In another embodiment, input actions may be assigned to buttons of physical keypad or directions of directional pad. In general, any possible input interface providing some number of unambiguous distinguishing input actions may be used for data input system of the invention. For example, possible input actions include, but not limited by a single and multi finger touches and clicks, swipes, flicks, gestures, rotations, sliding, tilting, displacements, sounds, phrases, image or light changes and combinations of these and other actions.

Different input hardware may be used with disclosed choice method. Any hardware capable to track changes of state or value of some parameter may be used for detection of some number of input actions may be used for implementation input system of the invention. This hardware includes, but not limited by touch pads and bars, touch screens and sensors, keypads, multi-directional d-pads, wheal pads, sliders, groups of buttons, switches, scroll wheals, accelerometers, compasses, motion tracking devices, microphones, light, color, image and video detectors, etc. Some of input actions may be assigned to service functions like canceling of wrong input, returning to the tree's root, etc.

Customization

The further aspect of efficient input is usability of access interface. The principal feature of access system of the present disclosure is that number of group alternatives is small enough to provide a comfortable human interaction. Cognitive psychologists found that an average human can concurrently operate less then 10 (about 7 plus minus 2) objects. Performance is nearly perfect and selection takes almost a constant time up to this number of different choices but declines as the number of different choices is increased. Therefore, the preferred number of alternatives for input systems of the present disclosure is less then 10. This suits well to the assumption on the limited number of input actions.

Another factor of efficient input is adaptation to individual needs of user and to application content. Initial weights of access objects may be either initialized into some constant values, or are set to some common statistical values for an average user. Every user has own preferences, and therefore access weights assigned to objects may be changed depending on user preferences and uses. To do that, an initial analysis of user documents may be made. For example, a system may scan all emails or messages sent by user and make a user-specific frequency dictionary and build a suggestion tree based on this user frequency dictionary. This approach may be very beneficial, because the user dictionary will contain user-specific words absent in general dictionary, and weight of words will correspond to user preferences.

In many cases, weights may also depend on a context, for example, they may be different for different fields in forms, or change over the time. For example, different fields, like state, name may have their own access trees. The access structure may be dynamically configured depending on these changes of word frequencies. Word frequencies may be changed after each word usage. Such access tree, rebuilt and automatically customized for user needs, preferences and application, may reduce access cost further and simplify user interfaces.

Ambiguous Input

The disclosed method is also applicable even for ambiguous input, when it is not clear what input action was selected or several actions were selected simultaneously. In this case the system may process further the sub-tree corresponding to all selected input actions. It may require dynamic reconstruction of the sub-tree.

Figure 11:
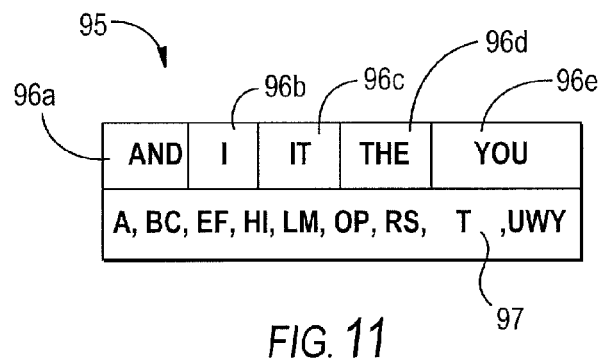
FIG. 11 is a schematic diagram of linear input interface for ambiguous input of English words, according to the present invention.

One embodiment 95 of ambiguous input of the invention displays some number of suggestions 96*a*-96*e* and a curve or line representing all other objects 97, as illustrated at FIG. 11. This line has object marks, corresponding to object groups. Positions of these marks and distance between them might be determined by weights of object groups, like for rational interfaces described above. The distance between marks may be smaller then finger width, so several marks may be selected simultaneously by touch. For example, we may have letter marks corresponding to groups having near equal weights, or marks of some initial letters along a line. User selects either one of suggested terminal words 96*a*-96*e*, or a position at the line 97 approximately corresponding to a desired word. The system analyzes an interval approximately corresponding to average finger width and make object suggestions in this interval for the next iteration and redraws object marks of objects within the reduced interval and the process is continued. Access procedure of this embodiment very resembles the arithmetic coding.

Simple Object Lists

As it was mentioned above the dictionary text input is one of the preferred embodiments of disclosed object access method. There exist a number of other content specific applications and devices requiring object access for functioning. Usually, object dictionary for these applications is limited by some subject area, content, or other semantic properties. Object descriptions may have a very different structure: from simple numeric, list, or text values to complex hierarchical structures combining several different values. As the object access method of the present disclosure is independent from data representation, it may be beneficial for such situations. Further, the method described herein includes alternative embodiments of disclosed object access method for different types of descriptions, applications and devices.

An access to object lists usually characterized by an object dictionary limited by some category and relatively long text descriptions. Examples of list data are numerous, and just a few examples of such lists are mentioned: goods, jobs, industries, applications, countries, states, cities, streets, names, companies, titles, months, etc. The usual method of access for object lists is a sequential selection of an object in a list. If a list is long it may be scrollable or indexed by a few first symbols. This method is not very good suit for systems with limited interfaces and mobile devices. Another approach is to use a regular text input for input of descriptions of object in the limited set. Typically, this is an excessive process. The disclosed access method provides a new efficient approach to input of list data, which is based on the same data structures and interfaces as described above for generic text input. The above-mentioned example with input of USA states is a good illustration of this case. Another example is input of vehicle make. As weight, the method can use the number of vehicle sales per maker.

Another example of list-based input is industrial input, when some object should be selected from industry-specific dictionary, like medical or pharmacy terms, or library of electrical appliances, etc. Yet another example of simple object lists is selection of operational modes and states of devices. For example: turning on/off, screen unlock, application switching.

Input of text strings, combining several words, for example, search phrases or book titles, also may benefit of using access system of the invention. In this case, the method may consider a dictionary of phrases and frequencies of these phrases. It may build the suggestion tree not for individual words, but for whole phrases.

Composite Hierarchical Data Access

Another important case of object description is a composite hierarchical data structure. Values of this type of data may be represented by a sequence of list values and have a hierarchical structure. For example, an item in a shop may have the following description: electronics/personalelectronics/handhelds/accessories/cases/iphone. Another good example is a word in a semantic dictionary: verb/modal/can. Such description represents a semantic hierarchical structure of the objects in the set. Each individual field of the description is some list value, which depends on previous fields and may be interpreted as a metasymbol, and the whole description may be interpreted as a metaword in a semantic dictionary of this specific content. After assignment of weights to these objects, the method can build an access tree combining semantic and object information. The metawords approach may be beneficial for construction of suggestion trees combining phonetic and semantic grouping described above, because the method can use semantic information at top levels and may remove it for terminal groups and for groups having the same semantics as their father group.

Typical methods of composite data access are hierarchical menus or lists. Their design often based on personal preferences, hierarchical structure and categories are voluntary, complex and unclear, and a path to desired object may be long. That may lead to user frustration and profit loses. The object access method of the present disclosure provides a method of the design of efficient interfaces for access to object with composite hierarchical data descriptions. It can optimize the access tree structure using existing categories, and it helps to select new optimal categories and access structure.

The user interface of typical informational applications was designed for use at desktop computers with keyboard and pointing devices, such as the mouse or touchpad. Usually, it is based on hierarchical menus with many items and recursive selections and long lists with sequential selection. The disclosed object data input method provides the method of efficient design of user interfaces for devices with limited input interfaces, optimal selection of categories and structure of hierarchical menu. Many regular computer applications provide an access to objects and procedures with composite hierarchical data description. The disclosed method may be used for design of optimal user interfaces for any type of application. For example, a frequent "Save" command may be located at the top level of access menu and require only one input action, but rarely used commands may be placed at lower levels and require several selection steps.

In the general aspect, the process of design of optimal hierarchical user interface based on optimal access trees consists of several stages: gathering of a statistics on how often elementary actions, commands, applications, pages, documents are used/accessed; creation of the structure of the access tree based on this statistics, semantic groupings of elementary actions and chosen number of input actions; and graphical representation of access interface. The first stage is a simple process of tracking user activity. At the second stage, optimal access trees are built using different possible semantic groupings for upper levels of trees as it was described for semantic dictionary access. After selection of most efficient semantic grouping, at the last stage the structure of tree is represented by user access interface. For many applications, the rational interface described above using input areas proportional to the weight of corresponding group is most applicable.

Multi-Dimensional Data Access

Another important case of object description is a multi-dimensional data structure. Values of this type of data may be represented by a list of individual simple values. For example, a person may have the following description: (First Name, Last Name, Year, Month, Date of Birth). Each individual field of the multi-dimensional description is some simple list or set value. Contrarily to hierarchical data, all individual fields of multi-dimensional data are independent from each other. After assignment of weights to objects, the method can build an access tree combining dimensional and object information.

Typical methods of multi-dimensional data access are tables with individually accessible fields. Access to individual field's values doesn't depend on other fields. The object access method of the present disclosure provides a method of the design of efficient interfaces for access to object with multi-dimensional data descriptions using access dimensional information of previously assessed fields. At the initial moment the method builds access trees for all individual fields. After access to some field, using the corresponding access tree for this field, the method may rebuild access trees for all remaining fields using the only objects, which satisfy previous object field selections. For example, after selection in the field "Year of birth", only persons having this year of birth will participate in construction of access tree for the field "First name". Each next selection in individual fields reduces the number of possible objects and makes corresponding access trees for other fields more optimal. This method may radically reduce the number of possible choices and minimize the access costs for multidimensional data structures.

Weights

Using different weights, different optimization strategies may be implemented: minimization of access time, maximization of profit, geographical localization, personal interest customization, etc. For example, user preferences and history of visits may be used for customization of access interface structure of a site. Depending on optimization strategy, the weight may be a sophisticated function depending on many parameters. For example, the weight may be calculated using both frequencies and time of use. The weight may be a sum of products of number of uses for some period of time and period coefficients. Period coefficients are increased for most recent periods. This method provides the update of the weights with time.

Another embodiment of the proposed system may use weights depending on usage statistics of word combinations, particularly word pairs. In this case, after an input of a first word, the suggestion tree for the next word may be built using frequencies of pairs with the first word in a pair. That further reduces access cost. To reduce memory usage, suggestion trees for word pairs may contain a limited number of most frequent word pairs, and if the word is not found in this tree, the system may use a general suggestion tree for the whole dictionary. Furthermore, a suggestion tree may be constructed for a set of phrases, for example, search phrases for some application or web search. In this case, phrases may be considered as long "words" of a dictionary of all possible input phrases.

Devices

The list of different devices and applications, which may benefit the use of the object access method of the present disclosure is very broad and includes, but is not limited to the following.

Communication devices, such as phones, smartphones and tablets: These devices have many applications requiring input: messaging, search, etc. For example, the typical contact application needs input of names of persons and companies in the contact list. The specific of object input for this application is that it is very dynamic, and the method may need to update the input tree and object weight quite often, because names are added and deleted from the list, and every call may change the weight of an object.

The specific example of assistive communication devices of the invention is improved stenography devices for accelerated recording of speech. Another important example is assistive text-to-speech conversion devices for speech-disabled persons. Fast selection of words from a large dictionary will benefit their communication abilities, comparing to existing devices.

Media Devices: This is a broad range of mobile and stationary Internet connected devices providing access to and play back of different media files. It includes, but not limited to audio and video players, connected frames and displays, electronic book readers, radio and TV receivers. Input of different properties of media objects may be necessary: author, artist, title of media object (e.g. channel, song, image, book, movie), and many others. Usually, media objects may by weighted by their popularity, number of accesses, or some other individual preferences.

Geo Positional Systems: Many devices and applications may require input of geographical and address information, like country, state, city, street names. These location-oriented devices and application include, but not limited by GPS, weather, news, payment, delivery, classifies applications. Special weights may be used for this type of input. For example, city, state or country names may use as weights populations and/or distance to the current position. Street names may use as weight their length. Locations may be entered using described above method for input of hierarchical data.

Input/Output Implements

While most of the embodiments of access system of the present disclosure use a graphical touch screen as input and output components, but embodiments using other input and output means are also covered by the application. One embodiment of object access system uses audio prompts for output component. Similarly, as for visual output, groups are presented to user sequentially and he selects the first group containing the object. Selection could be made using any input method, including voice recognition. The disclosed method provides guidance for the efficient design for voice control, access, answering, directory and informational systems. For example, using call statistics a company phone call system may be optimized to reduce average access time and to increase customer satisfaction. Another application is hands-free input system for automobiles. Yet another application for audio access interfaces is input method for blind persons.

Word input system of the present disclosure may be combined with audio output of entered words. Such combination of fast word access and its output may be very beneficial for person with speech difficulties and learner of foreign languages. Kids with speech disabilities may select words represented by their images in semantic tree. The system also may combine input in one language and output in another language providing simple interface for language translation. In general, input system of the invention may be combined with any other output system, interpreting and executing results of the selection.

Another embodiment of the input component of the access system of the invention might be based on color changes. The sequence of changing colors may represent the path in the access tree and the object. For example, words may be represented by printed color bar codes, a user may scan the word code using a simple apparatus (a hand wand) with color sensor; the wand traverses the tree accordingly the code, and "says" the scanned word. Such systems may be beneficial for kids learning to read, for students of foreign languages and persons with disabilities. They may be used to read text instead the Braille language. Such color bar, stripes and area codes also might be recognized by image analyses of photo or video frames, and may be used as image tags and labels, which doesn't require a connection to the remote servers and databases for reconstruction of the content. Such image tags may be used for computer recognized road and environment signs for computer assisted driving and navigation systems, and for blind persons.

Usage of color/light and sound/frequency access sequences for communication may be also beneficial in situations, when other communications means are limited. For example, such sequences might be used for naval and military communications instead of the Morse code.

As it was mentioned above, another possible embodiment of access system of the disclosed method may be gesture communication. A set of simple body, eye, hand, or finger gestures may be used for traversal of a suggestion tree built for some dictionary. Gesture signs represent the paths in the tree and words. It may be very beneficial for communication for peoples with different disabilities because word access requires a very small number of simple gestures.

As it was said above, any object in the corpus is uniquely defined by the path in the access tree from the root to the terminal node, containing the object. Therefore, an object may be represented by a code—the sequence of selection numbers of child nodes in this path, or the sequence of input actions for selections of these child nodes. For example, this code may be represented by the sequence of colors, sounds, strokes, textures and other communication means corresponding to selections of child nodes. These codes may be used for storage and transmission of objects and their sequences. Such graphical, tactile, visual and audio codes, representing words and object, may be beneficial for compact, human recognizable storage and transmission of information.

Distributed/Cloud System

In one embodiment of the access system of the present disclosure, the distributed system comprises input and output components at user devices communicating through a communication system to a remote or cloud-based processing system. The processing system may store and process access structure and generates representations of user interface for the output client. It may process input actions received from remote input component, which also may be physically separated from the output component and have its own communication access to the processing server. The output component displays a user access interface and presents the object after completed access.

This distributed approach removes memory- and time-expensive processing from input/output components, so these user devices may use very simple and inexpensive hardware or application, which may be easily added to existing system. This is very important for mobile and connected devices, having limited memory and processing hardware, input and/or output capabilities and wirelessly connected to processing system. Examples of such connected devices may be Wi-Fi photo frames and TV, Bluetooth watches, readers, phones, connected home appliances, etc.

For example, simple connected screens with separate remote control unit may be used for the full-scale access to and processing of any type of remote information and media. As an input device, any connected input device may be used. For example, a phone's keypad or touch screen with 3G connection may be used as a remote input device for access system using TV display or photo frame with WiFi connection as an output system. The processing system may be remote Internet application. In other embodiments, simple voice commands recognized by a smartphone may be used as input actions for connected TV.

Examples of Applications

The disclosed access method may be used for a broad range of application. One of the preferred embodiments is script independent text input. Many of modern devices have compact sizes, and have either a small keypad with a few keys or no keypad at all. So implementation of efficient text input for such devices may be very beneficial. The disclosed input method benefits text input for devices with limited input interfaces for all languages, including alphabetic ones. It is suited for a small number of input actions of physical or virtual keypads, or other input hardware. It provides a reduced number of input actions comparing to other known input methods for mobile devices.

Some embodiments of access systems of the present disclosure include, but not limited by the following systems. Single category access systems: These systems store a large number of objects belonging to the same category and having the similar structure of a description. Examples of such systems are: music play lists and archives, book libraries, video archives. Such access systems also may be used for online stores selling one type of goods or access to the information of the same type, for example, job lists, news sites, social networks, such as Facebook, Twitter.

Typical methods of access include a multi-page list of objects, sorted by some of their properties: alphabetically, by popularity, by price, by distance, etc. Access to a desired object may require sequential visual scanning of object at pages with scrolling and several page turns. To accelerate access process, objects may be subdivided to several groups by their properties. Very often, this subdivision is voluntary, unbalanced, too dense or contrarily too sparse. The disclosed method provides efficient design of access structure based on available input hardware and different weight optimizations.

Multiple categories access systems: These applications store a large number of objects from very different categories. Objects in different categories may have different properties and structure of description of these properties. Usually these systems use two-tier object access: one for selection of a category, and another for the access to objects within a category. Examples of such systems are: online directories, shops, catalogs, yellow pages, classifies. Again, if the number of object categories is large, then access to a desired category and structure of access tree may be optimized using disclosed access method.

Therefore, the disclosed method of object access may be used for optimal design of user interfaces of software application, including web-based application. It is especially very beneficial for the design of application for mobile and connected devices. In this case, devices may support only processing of user input/output interaction without storage of object access structures and more importantly storage of objects itself. After selection, the object may be dynamically streamed to mobile or connected devices for presentation without storage of the entire object.

Moreover, graphical selection and input interfaces may be also represented by pure or structured images dynamically streamed to user devices. In this case, hardware and software requirements for user devices may be lowered further, which may lead to price reduction of user devices without sacrificing of processing capabilities.

Computer Access

Extraction and suggestion trees provide innovative system for human access to data. But similarly, as subdivision trees, in many cases, they may be used for computer data access and storage. As mentioned above, the group belonging tests may be executed in parallel and the first satisfactory group is selected for continuation. Usage of disclosed structures may be beneficial for access of large textual databases.

Another application of extraction and suggestion trees is data compression, especially for text compression, and even more especially for text compression for non-alphabet languages. Objects may be coded by representations of their access paths in a suggestion tree. For decoding, the system simply reconstructs the object by its path.

The person skilled in the art will recognize that the present embodiments may be incorporated into hardware and software systems and devices for object access. These devices or systems generally may include a computer system including one or more processors that are capable of operating under software control to provide the object access of the present disclosure.

Computer program instructions may be loaded onto a computer or other programmable apparatus to produce a machine, such that the instructions, which execute on the computer or other programmable apparatus together with associated hardware create means for implementing the functions of the present invention. These computer program instructions may also be stored in a computer-readable memory that can direct a computer or other programmable apparatus to function in a particular manner, such that the instructions stored in the computer-readable memory together with associated hardware produce an article of manufacture including instruction means which implement the functions of the present invention. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the present invention.

It will also be understood that functions of the present invention can be implemented by special purpose hardware-based computer systems, which perform the specified functions or steps, or combinations of special purpose hardware and computer instructions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An object access system comprising:
an input component; and
a processor coupled to said input component and configured to
construct an extraction tree based upon an ordered list of a plurality of objects, each object having an object description and associated weighted value,
the extraction tree comprising a plurality of nodes, each node having a node range for representing a group of objects based upon the respective object descriptions, the plurality of nodes comprising at least one parent node, and a plurality of ordered child nodes associated therewith and having node ranges, the at least one parent node having first and second ordered child nodes, the second ordered child node being after the first ordered child node in a respective order and having a node range overlapping a node range of the first ordered child node, the first ordered child node comprising at least one of a terminal and a non-terminal node, the second ordered child node comprising a non-terminal node, and
traverse the extraction tree, based upon user input from said input component, along an access path from a root node to a terminal node including a selected access object by selecting, for each parent node along the access path, a respective first ordered child node in the plurality of ordered child nodes, the respective first ordered child node having a node range including the access object.

2. The object access system of claim 1 wherein said processor is configured to construct the extraction tree to minimize an average weighted length of the access path for traversal of the extraction tree.

3. The object access system of claim 1 further comprising an output component coupled to said processor and configured to present to a user respective object descriptions of the plurality of ordered child nodes of the at least one parent node during the traversal of the extraction tree.

4. The object access system of claim 1 wherein each object description comprises a textual sequence in a language corpus; and wherein the associated weighted value comprises a frequency usage of the corresponding textual sequence in the language corpus.

5. The object access system of claim 4 wherein a textual sequence comprises at least one of a symbol, a word or a phrase of a language.

6. The object access system of claim 4 wherein the language corpus is associated with a language comprising a non-alphabet language.

7. The object access system of claim 1 wherein each object description comprises at least one of a composite hierarchical or a multidimensional structure.

8. The object access system of claim 1 wherein each object comprises at least one of (i) an item in online store, (ii) a song, (iii) a book, (iv) a movie, (v) a news article, (vi) a personal name, (vii) a geographic name, (viii) an application, (ix) a command, (x) a menu item.

9. The object access system of claim 1, configured as a part of a device selected from a group consisting of a phone, a smartphone, a personal media device, a GPS device, a computer, a tablet, an electronic dictionary, a watch, a TV set, an automobile control panel, a smartcard, a stenographic device, an assistive communication device.

10. The object access system of claim 1 wherein said processor is configured to:
update the ordered list and the weighted values based upon at least one of a user preference and an access history; and
reconstruct the extraction tree based upon the updated ordered list.

11. The object access system of claim 1 wherein each node range comprises at least one of a word stem, a partial description of a level of hierarchy, and a range in the ordered list.

12. The object access system of claim 1 wherein said input component is configured to receive a number of distinguishing user input actions; and wherein the at least one parent node has an associated number of child nodes less than or equal to the number of distinguishing user input actions.

13. The object access system of claim 1 wherein a number of the terminal child nodes for each parent node of the extraction tree is greater than or equal to a set number value.

14. The object access system of claim 1 wherein the respective node ranges for the non-terminal child nodes of the at least one parent node of the extraction tree are not overlapping.

15. The object access system of claim 1 wherein said input component comprises a touch screen display having a plurality of touch input areas; and wherein the user input comprises selection of a touch input area from a plurality thereof representing the plurality of child nodes for the at least one parent node.

16. The object access system of claim 15 wherein each touch input area has a display size proportional to a total weighted value for the group of objects represented by a corresponding child node.

17. The object access system of claim 1 wherein the user input comprises a plurality of directional displacements in directions representing selections of child nodes.

18. The object access system of claim 17 wherein access path is represented by a continuous sequence of directional displacements representing selections of corresponding child nodes.

19. The object access system of claim 1 wherein the user input comprises a touch of plurality of buttons representing selections of child nodes.

20. The object access system of claim 1 wherein the user input comprises a plurality of at least one gesture, colors or sounds representing selections of child nodes, and wherein access path is represented by a sequence of gestures, colors or sounds.

21. The object access system of claim 1 wherein the user input is ambiguous; and wherein said processor is configured to reconstruct the extraction tree at each access step for objects in selected child nodes.

22. The object access system of claim 1 further configured to receive from an external source a code representing the access path to an object and to traverse the tree accordingly the received access code to the access object.

23. A method of operating an object access system comprising an input component, and a processor coupled to the input component, the method comprising:
using the processor to construct an extraction tree based upon an ordered list of a plurality of objects, each object having an object description and associated weighted value, the extraction tree comprising a plurality of nodes, each node having a node range for representing a group of objects based upon the respective object descriptions, the plurality of nodes comprising at least one parent node, and a plurality of ordered child nodes associated therewith and having node ranges, the at least one parent node having first and second ordered child nodes, the second ordered child node being after the first ordered child node in a respective order and having a node range overlapping a node range of the first ordered child node, the first ordered child node comprising at least one of a terminal and a non-terminal node, the second ordered child node comprising a non-terminal node; and using the processor and the input component to traverse the extraction tree, based upon user input from the input component, along an access path from a root node to a terminal node including a selected access object by selecting, for each parent node along the access path, a respective first ordered child node in the plurality of ordered child nodes, the respective first ordered child node having a node range including the access object.

24. The method of claim 23 further comprising using the processor to construct the extraction tree to minimize an average weighted length of the access path for traversal of the extraction tree.

25. The method of claim 23 further comprising using an output component coupled to said processor and presenting to user respective object descriptions of child nodes of parent nodes during the traversal of the extraction tree.

26. The method of claim 23 wherein each object description comprises a textual sequence in a language corpus; and wherein the associated weighted value comprises a frequency usage of the corresponding textual sequence in the language corpus.

27. The method of claim 23 wherein a textual sequence comprises at least one of a symbol, a word or a phrase of a language.

28. The method of claim 23 wherein the language corpus is associated with a language comprising a non-alphabet language.

29. An apparatus with a non-transitory computer-readable medium, wherein the non-transitory computer-readable medium having computer-executable instructions for causing the object access system to perform steps comprising:

constructing an extraction tree based upon an ordered list of a plurality of objects, each object having an object description and associated weighted value, the extraction tree comprising a plurality of nodes, each node having a node range for representing a group of objects based upon the respective object descriptions, the plurality of nodes comprising at least one parent node, and a plurality of ordered child nodes associated therewith and having overlapping node ranges, the at least one parent node having first and second ordered child nodes, the second ordered child node being after the first ordered child node in a respective order and having a node range overlapping a node range of the first ordered child node, the first ordered child node comprising at least one of a terminal and a non-terminal node, the second ordered child node comprising a non-terminal node; and traversing the extraction tree, based upon user input from the input component, along an access path from a root node to a terminal node including a selected access object by selecting, for each parent node along the access path, a respective first ordered child node in the plurality of ordered child nodes, the respective first ordered child node having a node range including the access object.

30. The apparatus of claim 29 further comprising constructing the extraction tree to minimize an average weighted length of the access path for traversal of the extraction tree.

31. The apparatus of claim 29 further comprising presenting to user respective object descriptions of child nodes of parent nodes during the traversal of the extraction tree.

32. The apparatus of claim 29 wherein each object description comprises a textual sequence in a language corpus; and wherein the associated weighted value comprises a frequency usage of the corresponding textual sequence in the language corpus.

33. The apparatus of claim 29 wherein a textual sequence comprises at least one of a symbol, a word or a phrase of a language.

34. The apparatus of claim 29 wherein the language corpus is associated with a language comprising a non-alphabet language.

* * * * *